(12) United States Patent
Hannuksela et al.

(10) Patent No.: US 8,788,933 B2
(45) Date of Patent: Jul. 22, 2014

(54) TIME-SHIFTED PRESENTATION OF MEDIA STREAMS

(75) Inventors: Miska Hannuksela, Ruutana (FI); Jani Toiminen, Tampere (FI)

(73) Assignee: Nokia Corporation, Espoo (FI)

( * ) Notice: Subject to any disclaimer, the term of this patent is extended or adjusted under 35 U.S.C. 154(b) by 2985 days.

(21) Appl. No.: 11/292,786

(22) Filed: Dec. 1, 2005

(65) Prior Publication Data

US 2007/0130498 A1 Jun. 7, 2007

(51) Int. Cl.
*G06F 17/00* (2006.01)

(52) U.S. Cl.
USPC .......................................................... 715/234

(58) Field of Classification Search
USPC .................................... 348/E5.007; 715/234
See application file for complete search history.

(56) References Cited

U.S. PATENT DOCUMENTS

| | | | | |
|---|---|---|---|---|
| 5,701,383 A * | 12/1997 | Russo et al. | ...................... | 386/46 |
| 5,903,264 A * | 5/1999 | Moeller et al. | ................. | 715/719 |
| 6,065,050 A * | 5/2000 | DeMoney | ...................... | 709/219 |
| 6,134,243 A * | 10/2000 | Jones et al. | ..................... | 370/465 |
| 6,480,667 B1 * | 11/2002 | O'Connor | ......................... | 386/83 |
| 6,580,870 B1 * | 6/2003 | Kanazawa et al. | .............. | 386/95 |
| 6,591,058 B1 * | 7/2003 | O'Connor et al. | .............. | 386/65 |
| 6,631,485 B1 * | 10/2003 | Morley et al. | .................. | 714/701 |
| 7,302,697 B1 * | 11/2007 | Wilson et al. | .................. | 725/110 |
| 2001/0014210 A1 | 8/2001 | Kang | .............................. | 386/96 |
| 2001/0037375 A1 * | 11/2001 | Story et al. | ..................... | 709/217 |
| 2002/0007493 A1 * | 1/2002 | Butler et al. | ................... | 725/109 |
| 2002/0053078 A1 * | 5/2002 | Holtz et al. | ...................... | 725/14 |
| 2002/0057898 A1 | 5/2002 | Normile | | |
| 2002/0105951 A1 * | 8/2002 | Hannuksela et al. | .......... | 370/389 |
| 2002/0146233 A1 * | 10/2002 | Barton et al. | .................... | 386/46 |
| 2003/0001880 A1 * | 1/2003 | Holtz et al. | .................... | 345/716 |
| 2003/0061369 A1 * | 3/2003 | Aksu et al. | ..................... | 709/231 |
| 2003/0110513 A1 * | 6/2003 | Plourde et al. | ................ | 725/134 |
| 2004/0146285 A1 | 7/2004 | Matsui et al. | | |
| 2004/0243715 A1 * | 12/2004 | Yokoyama | .................... | 709/231 |

(Continued)

FOREIGN PATENT DOCUMENTS

| WO | WO 01/56270 | 8/2001 |
|---|---|---|
| WO | WO 2005/004491 | 1/2005 |

OTHER PUBLICATIONS

"3GPP2 file Formats for Multimedia Services"; Dec. 12, 2003; retrieved from Internet: URL:http://www.3gpp2.org/public_html/specs/C.S0050-0_v1.0_121503.pdf on May 30, 2007; Figure B3, p. 46, lines 23-24, p. 47, lines 6-8, p. 47, lines 13-28.

(Continued)

*Primary Examiner* — Doug Hutton, Jr.
*Assistant Examiner* — Mustafa Amin
(74) *Attorney, Agent, or Firm* — Harrington & Smith

(57) ABSTRACT

For enabling a time-shifted presentation of at least one received media stream, at least one media fragment is created. The at least one media fragment includes media data from a section of the at least one received media stream and associated media data. The media data is stored to a media data section of a file and the associated meta data is stored to a meta data section of this file. In case of a user request to start a time-shifted presentation, the file may then be parsed for retrieving media data of a respective media fragment for presentation.

30 Claims, 5 Drawing Sheets

(56) References Cited

U.S. PATENT DOCUMENTS

| | | | |
|---|---|---|---|
| 2005/0155071 A1* | 7/2005 | Notoya et al. | 725/88 |
| 2005/0183127 A1* | 8/2005 | Ngo et al. | 725/90 |
| 2005/0238057 A1* | 10/2005 | Toma et al. | 370/503 |
| 2005/0254498 A1* | 11/2005 | Itoh | 370/394 |
| 2006/0165088 A1* | 7/2006 | Monta et al. | 370/395.4 |
| 2006/0171658 A1* | 8/2006 | Jochemsen et al. | 386/46 |
| 2006/0291798 A1* | 12/2006 | Suneya | 386/52 |
| 2007/0053658 A1* | 3/2007 | Murakami et al. | 386/95 |
| 2007/0115963 A1* | 5/2007 | Vadlakonda et al. | 370/389 |
| 2009/0103890 A1* | 4/2009 | O'Connor et al. | 386/65 |

OTHER PUBLICATIONS

"Advanced video coding for generic audiovisual services;" Series H: Audiovisual and Multimedia Systems Infrastructure of audiovisual services—coding of moving video; TIU-T, H.264; Mar. 2005.

"Information technology—coding of audio-visual objects; Part 12: ISO base media file format;" ISO/IEC 14496-12; Oct. 1, 2005.

"RTP Payload Format for MPEG-4 Audio/Visual Sreams;" Y. Kikuchi et al.; RFC 3016; Nov. 2000.

"RTP Payload Format for H.264 Video;" S. Wenger et al; RFC 3984; Feb. 2005.

"RTP: A Transport Protocol for Real-Time Applications;" H. Schulzrinne et al; RFC 3550; Jul. 2003.

"Coding of Moving Pictures and Audio;" D. Singer et al; ISO/IEC FDIS 14496-14; Apr. 30, 2003.

"Transparent end-to-end packet switched streaming service (PSS);" 3GPP TS 26.244 V6.4.0 Sep. 2005.

Extended RTP profile for RTCP-based Feedback (RTP/APF), J. Ott et al; Aug. 10, 2004.

"Information technology—coding of audio-visual objects;" Part 3: Audio; ISOIEC 14496-3, Dec. 15, 2001.

"Information technology—coding of audio-visual objects;" Part 14: MP4 file format; ISO/IEC 14496-14; Nov. 15, 2003.

"Information technology—coding of audio-visual objects;" Part 3: Audio, Amendment 1: Bandwidth extension; ISO/IEC 14496-3, Nov. 1, 2003.

"Information technology—coding of audio-visual objects;" Part 3: Audio; Amendment 2: Parametric coding for high-quality audio; ISO/IEC 14496-3, Aug. 1, 2004.

\* cited by examiner

US 8,788,933 B2

TIME-SHIFTED PRESENTATION OF MEDIA STREAMS

FIELD OF THE INVENTION

The invention relates to a method and a software program product for enabling a time-shifted presentation of at least one received media stream. The invention relates equally to a chipset, an electronic device and an apparatus enabling a time-shifted presentation of at least one received media stream.

BACKGROUND OF THE INVENTION

Various electronic devices are enabled to receive and present media streams. Such media streams can be received for example from a Digital Video Broadcasting-Handhelds (DVB-H) network that broadcasts media streams in accordance with the DVB-H standard.

The DVB-H standard is a terrestrial digital transmission standard that enables specifically mobile devices to receive broadcast multimedia data. DVB-H Internet Protocol datacasting (IPDC) broadcast uses Real-Time Transport Protocol (RTP) communication protocol. A streaming service is defined as a set of synchronized media streams delivered in a time-constrained or unconstrained manner for immediate consumption during the reception. Each streaming session may comprise audio, video and/or other real-time media data like timed text. Individual RTP media streams are used for each media.

A user receiving media data for a movie by means of a mobile television (TV), for instance, can watch the movie and/or record it to a file. When a user is watching a movie on a mobile TV receiver, he/she may further want to be able to pause the presentation to take a little break and to resume the watching at a later time. To enable such user action, the media data must be recorded at least from the time of the requested pause, and it must be retrieved from the storage when the user wants to resume the watching. Alternatively, a user might have started recording a movie without presenting it simultaneously with any rendering device with the intent of watching the recording later. However, the user may wish to start watching during the broadcast of the movie while the movie is still being recorded.

In contrast to Digital Video Broadcasting-Terrestrial (DVB-T), which uses a self-contained MPEG-2 transport stream containing elementary MPEG-2 video and audio streams according to ISO/IEC International Standard 13818, elementary audio and video bitstreams are encapsulated on RTP, UDP (User Datagram Protocol), IP, and MPE (Multi-Protocol Encapsulation) for IP datacasting over DVB-H. The audio and video compression formats are typically the H.264/AVC (Advanced Video Codec) video format and the MPEG-4 HE-AACv2 (High-Efficiency Advanced Audio Codec Version 2) audio format. H.264/AVC is specified in ITU-T Recommendation H.264 and ISO/IEC International Standard 14496-10:2004: "Information technology—Coding of audio-visual objects—Part 10: Advanced Video Coding", while MPEG-4 HE-AACv2 is specified in ISO/IEC International Standard 14496-3 (2001): "Information technology—Generic coding of moving picture and associated audio information—Part 3: Audio" including ISO/IEC 14496-3 AMD-1 (2001): "Bandwidth Extension" and ISO/IEC 14496-3 (2001) AMD-2: (2004), "Parametric Coding for High Quality Audio".

When data in H.264/AVC video format and MPEG-4 HE-AACv2 audio format is to be stored, it is generally stored in a 3 GP file format, also known as 3 GPP (Third Generation Partnership Project) file format, or in a MP4 (MPEG-4) file format. The 3 GP file format is specified in 3 GPP Technical Specification 26.244 V6.4.0 (2005-09): "Technical Specification Group Services and System Aspects; Transparent end-to-end packet switched streaming service (PSS); 3 GPP file format (3 GP)", while the MP4 file format is specified in ISO/IEC Internal Standard 14496-14:2003: "Information technology—Coding of audio-visual objects—Part 14: MP4 File Format". Both 3 GP and MP4 are derived from the ISO (International Organization for Standardization) base media file format, which is specified in the ISO/IEC International Standard 14496-12:2005 "Information technology—Coding of audio-visual objects—Part 12: ISO base media file format". A file of this format comprises media data and metadata. For a file to be operable, both of these data must be present. The media data is stored in a media data box MDAT and the meta data is stored in a movie box MOOV. The media data comprises the actual media samples. It may comprise for example interleaved, time-ordered video and audio frames. Each media has its own metadata box TRAK in the MOOV box that describes the media content properties. Additional boxes in the MOOV box may comprise information about file properties, file content, etc.

Because a 3 GP/MP4 file has separate media data (MDAT) and metadata (MOOV) parts, all media data has to be known at the time when metadata is written to the file. For example, many boxes of a 3 GP/MP4 file, such as a Decoding Time to Sample box STTS, include an entry count of samples to which the box is associated. In general, the entry count can be derived only when the duration of the media tracks and the sample rate are known. This results in a problem when a 3 GP/MP4 file is to be used for recording data upon a pause request by a user. The file format makes it impossible to resume the watching until the recording of the file has ended and both media data and metadata is saved to the file. Such a long pause will usually not be acceptable to the user.

SUMMARY OF THE INVENTION

It is an object of the invention to enable an alternative storage of media data for a time-shifted consumption of received multimedia streams.

A method for enabling a time-shifted presentation of at least one received media stream is proposed. The method comprises creating at least one media fragment. The at least one media fragment includes media data from a section of the at least one received media stream and associated meta data. The media data is stored to a media data section of a file and the associated meta data is stored to a meta data section of this file. In case of a user request to start a time-shifted presentation, the method further comprises parsing the file for retrieving media data of a respective media fragment for presentation.

Moreover, a chipset enabling a time-shifted presentation of at least one received media stream is proposed. The chipset may comprise one chip or a plurality of chips. The at least one chip includes a file writer component adapted to create at least one media fragment, the at least one media fragment including media data from a section of at least one received media stream and associated meta data, and adapted to store the media data to a media data section of a file and the associated meta data to a meta data section of the file. The at least one chip further includes a file parser component adapted to parse a file for retrieving media data of a respective media fragment for presentation in case of a user request to start a time-shifted presentation.

Moreover, an electronic device enabling a time-shifted presentation of at least one received media stream is proposed. The electronic device comprises a file writer component and a file parser component realizing the same functions as the corresponding components of the proposed chipset. In the electronic device, these components may be implemented by hardware and/or software. They could be implemented for example by integrating the proposed chipset in the electronic device. Alternatively, they could be implemented for example by a processor running corresponding provided software program code components.

Moreover, an apparatus enabling a time-shifted presentation of at least one received media stream is proposed. The apparatus comprises means for creating at least one media fragment, the at least one media fragment including media data from a section of at least one received media stream and associated meta data, and for storing the media data to a media data section of a file and the associated meta data to a meta data section of the file. The apparatus further comprises means for parsing a file for retrieving media data of a respective media fragment for presentation in case of a user request to start a time-shifted presentation.

Finally, a software program product is proposed, in which a software code for enabling a time-shifted presentation of received media streams is stored in a readable memory. When executed by a processor of an electronic device, the software code realizes the proposed method.

The invention proceeds from the consideration that the above mentioned ISO base media file format has been supplemented by an addition called movie fragments. The media samples for the movie fragments are in the MDAT box, as usual, if they are in the same file. For the meta data of the movie fragments, however, a MOOF box is provided. It comprises the information that would previously have been in the MOOV Box. The MOOV Box still represents a valid movie on its own, but in addition, it comprises an MVEX Box indicating that movie fragments will follow in the same file. The movie fragments extend the presentation that is associated to the MOOV box in time. The use of movie fragments is equally described in the above cited international standard ISO/IEC 14496-12:2005.

Movie fragments are typically used in progressive downloading to speed up initial buffering and to reduce client-side buffering requirements. For a progressive downloading, a 3 GP/MP4 file may be organized into movie fragments of a certain maximum size in terms of bytes. Audio, video, and potential other real-time media tracks within the movie fragments are interleaved. The file is stored in an HTTP server and can be fetched using the HTTP GET request. The client buffers the beginning of the file, until it estimates that the rest of the file can be obtained without any pauses in the playback. Then it starts decoding and playback. This initial buffering delay is shorter than for files without movie fragments, as the MOOV box and the first MOOF box in the fragmented file are typically smaller in terms of bytes than the MOOV box in the corresponding non-fragmented file. Moreover, the client can dispose movie fragments, both meta and media data, when the decoding and playback have proceeded to the next movie fragment.

It is now proposed that media data of received media streams are organized and stored in the form of media fragments. Thus, the media fragments are created only at the receiving end. The media streams may be transmitted in real-time, for instance in a broadcast transmission. The media fragments comprise media data and associated meta data in different sections of a file. The media fragments may be, but do not have to be, movie fragments of an ISO base media file format.

It is an advantage of the invention that it enables a time-shifted consumption of received real-time multimedia streams. At the same time, a general-purpose standard file format may be used for the recording, for instance the ISO base media file format.

The user request to start a time-shifted presentation can be, for example, a request to present the media data from a beginning of the media stream. Such a request can be considered if the media data has been recorded from the beginning of the media stream, at least partly in form of media fragments. The user request to start a time-shifted presentation can further be for example a request to present the media data from an indicated position in the media stream. The user request to start a time-shifted presentation can further be for example a request to resume an interrupted presentation of the media data after a preceding pause request by a user during an ongoing presentation of the media stream.

Further, the time-shifted presentation may be enabled by a user request. Such a request may include a request to pause an ongoing presentation, but it may also be a request that prevents a real-time presentation from the very beginning. The detection of a user request to enable a time-shifted presentation may be a prerequisite to the creation of media fragments. This ensures that media fragments have only to be created if needed.

The proposed electronic device may comprise a user interface enabling a user to control the time-shifted presentation by means of various user requests.

In case a user request to enable a time-shifted presentation is a pause request, an ongoing presentation of at least one received media stream may be interrupted. The proposed chipset, the proposed electronic device and the proposed apparatus may comprise a processing component enabling such an interruption.

In one embodiment of the invention, media data of the at least one media stream comprises encoded data components that can be decoded independently, that is, without reference to any other encoded data component, and encoded data components that can only be decoded with knowledge about at least one preceding data component. In the case of video data, the data components can be for instance pictures, like video frames or video fields. An encoded data component that can be decoded independently is referred to as intra picture in the MPEG standards or as Instantaneous Decoding Refresh (IDR) picture in the H.264/AVC standard. In the following, any reference to an intra picture is intended to cover as well an IDR picture and other types of data components that can be decoded on its own as well. In a transmission, there are usually intra pictures occurring every once in a while, typically at least once in a Multi-Protocol Encapsulation-Forward Error Correction (MPE-FEC) frame, to achieve reasonable tune-in times. In order to ensure that a respective media fragment can be decoded, media data of each created media fragment should comprise in this case for each media stream at least a first encoded data component that can be decoded independently.

There are various options for ensuring that for each media stream a first encoded data component of a first media fragment is an encoded data component that can be decoded independently.

In one possible option, media data of the at least one received media stream are buffered after reception back to a respective last encoded data component that can be decoded independently. Each media fragment may then be created for each media stream from encoded data components starting from a respective buffered last encoded data component that can be decoded independently. The buffering may take place using a memory buffer or a file using whatever suitable format.

This approach implies that in most cases of an interrupted presentation there will be data in the first movie fragment that has already been presented. Upon a user request to resume the presentation, the media data of a media fragment may therefore be decoded starting with a first encoded data component of the at least one media stream in the media fragment, but the media data of the media fragment may be presented only starting with a data component of the at least one media stream that was not yet presented at a time of a pause request. The pre-rolling process may be carried out in the background before the user requests that the presentation is resumed, in order to achieve a faster response time.

In another possible option, an encoded data component of the at least one media stream that is to be used as a first encoded data component of a media fragment is decoded, and encoded again to an encoded data component that can be decoded independently. The required decoding may be achieved in a decoding process parallel to a decoding process employed for the presentation. Alternatively, the decoding results for the presentation may be provided in addition for a possible media fragment creation.

All subsequent media fragments may comprise in both options media data from one encoded data component in the at least one data stream that can be decoded independently to one of the following encoded data components that can be decoded independently, exclusive of this following encoded data component that can be decoded independently.

In one embodiment of the invention, at least one media fragment is created at least for all media data of the at least one received media stream that are received after a user request to enable a time-shifted presentation.

The media fragments may have a variable length or a fixed length. If they have a variable length, the length may depend in particular on the length between a user request to enable a time-shifted presentation and a request to start a time-shifted presentation.

For example, a first media fragment may be created only upon a user request to start a time-shifted presentation of the media data. Any subsequent media fragment may then be created only when decoding of a preceding media fragment is about to reach an end. In case the user does not request to start a time-shifted presentation before all media data of the at least one media stream have been received, however, a single media fragment could be created in this case as well upon termination of the reception.

A fixed length of the media fragments, in contrast, may be of advantage in case only a limited buffer size is available for storing the media data of the received media streams.

A predefined minimum time may be set to be required between a user request to enable a time-shifted presentation and a user request to start a time-shifted presentation. In case of media streams comprising intra pictures, this allows ensuring that each media fragment may start off with a new intra picture.

Further, the actual presentation of media data from the media fragments could be delayed a little after a request by the user to start a time-shifted presentation, depending on the processing capacities of the device in which the invention is implemented, for example by 3 seconds. Thereby, it can be ensured that the device is able to carry out all processing and also that the movie fragments do not become too small in case the user switches quickly between a request to enable a time-shifted presentation and a request to start a time-shifted presentation.

During a real-time presentation of at least one received media stream, the received media stream may be stored in parallel to a file. In this case, a storage of the at least one received media stream may be ended upon a pause request by the user, and meta data may be created for the stored part of the at least one received media stream and stored in the file. The meta data may comprise an indication of a presence of media fragments with the MVEX box of the ISO base media file format. At least one media fragment may then be created for the subsequent media data of the media stream and stored in the same file, as described above.

With this approach, it can be ensured that the entire at least one received media stream is stored for later use, while it is ensured at the same time that the presentation can be continued after the pause by accessing the media fragments.

The at least one received media stream can be for example at least one media stream of a DVB-H broadcast, but equally any other at least one received media stream, in particular any other at least one received real-time media stream.

The at least one received media stream may comprise for example an audio data stream and/or a video data stream, but equally any other media data streams. A combination of a received audio data stream and a received video data stream may belong for example to a movie.

In one embodiment of the invention, the at least one received media stream may comprise at least a video data stream with video data in an H.264 AVC video format and/or an audio data stream with audio data in an MPEG-4 HE-AACv2 audio format. In this case, the file may have a 3 GP file format or an MP4 file format.

In this embodiment, but equally in other embodiments, the file may comply with the ISO base media file format as defined in the above cited standard ISO/IEC 14496-12:2005 and the media fragment may be a movie fragment defined for the ISO base media file format.

The use of an ISO base media file format for the recording has the advantage that it is a general-purpose standard container file format. Such a format enables an easy transfer of the file and a later re-play of the file with any player application. If a non-standard file format is used for recording and the recorded file is later transferred to another device, a conversion operation to a standard file format may be required. Furthermore, it may reduce the implementation and testing effort of time-shifted multimedia consumption when a regular media player application can be used for the playback in contrast to a dedicated player. With the presented approach, a player resuming a presentation may act similarly to the case when it receives a progressively downloaded file.

It is to be understood that any of the method, the chipset, the electronic device, the apparatus and the software program product of the invention may be implemented in accordance with any of the presented embodiments.

The invention can be implemented in any electronic device that is adapted to receive and present media streams, for example, though not exclusively, in a mobile or stationary TV receiver, in a mobile or stationary radio receiver, in a mobile communication device like a mobile phone, in a laptop or in a stationary personal computer (PC).

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
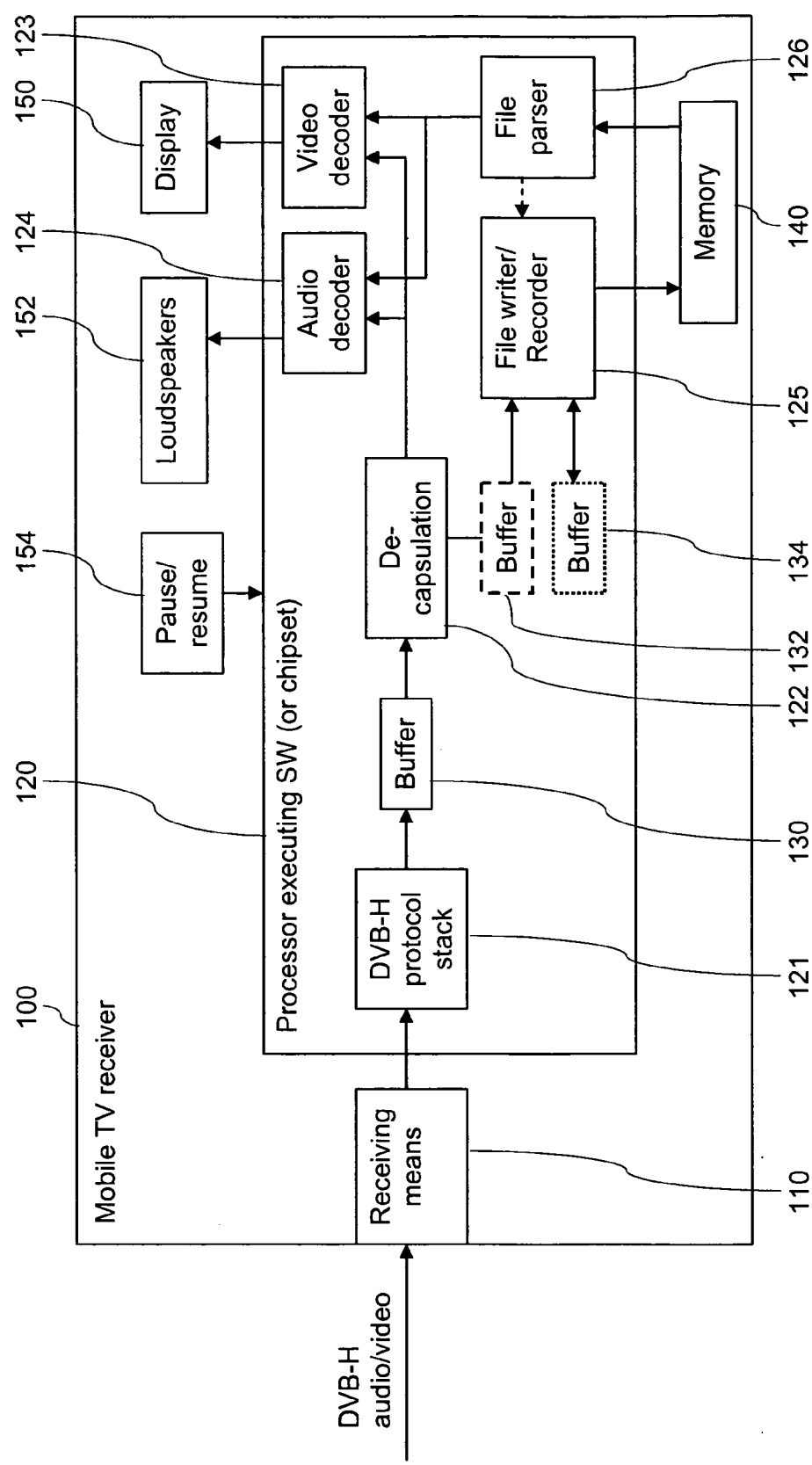
FIG. 1 is a schematic block diagram of an electronic device according to an embodiment of the invention.

FIG. 1 is a schematic block diagram of an electronic device, which enables a pause of a presentation of broadcast movie data in accordance with an exemplary embodiment of the invention.

By way of example, the electronic device is a mobile TV receiver 100. It is to be understood that only components of the mobile TV receiver 100 that are relevant for the understanding of embodiments of the invention are shown and described.

The mobile TV receiver 100 comprises receiving means 110 including an antenna, processing means 120, a memory 140, a display 150, loudspeakers 152 or an audio output for connecting some kind of speakers, and a user interface including a pause/resume button 154.

The processing means 120 may be for instance a processor that is adapted to execute various software code components. The implemented software code components include a DVB-H protocol stack 121, a decapsulation component 122, a video decoder 123, an audio decoder 124, a file writer or recorder 125 and a file parser 126. The DVB-H protocol stack 121 is linked via a first buffer 130 to the decapsulation component 122. The decapsulation component 122 is linked to the video decoder 123 and the audio decoder 124. In addition, the decapsulation component 122 is linked to the file writer/recorder 125. In a first alternative, the decapsulation component 122 is linked to the file writer/recorder 125 via a second buffer 132, indicated with dashed lines. In a second alternative, the decapsulation component 122 is linked directly to the file writer/recorder 125, and the file writer/recorder 125 has access to a second buffer 134, indicated with dotted lines. The file parser 126 is linked to the file writer/recorder 125 and as well to the video decoder 123 and the audio decoder 124. It is to be understood that the processing means 120 could equally be realized in form of a chipset including at least one chip that realizes the functions of the mentioned software code components and buffers.

DVB-H media streams received by the receiving means 110 are forwarded to the DVB-H protocol stack 121. The file writer/recorder 125 has a writing access to the memory 140, while the file parser 126 has a reading access to the memory 140. The video decoder 123 has access to the display 150, and the audio decoder 124 has access to the loudspeakers 152. Signals generated by the pause/resume button 154 are provided to the decapsulation component 122, to the file writer/ recorder 125 and to the file parser 126. This is only indicated by a general link of the pause/resume button 154 to the processor 120.

Figure 2:
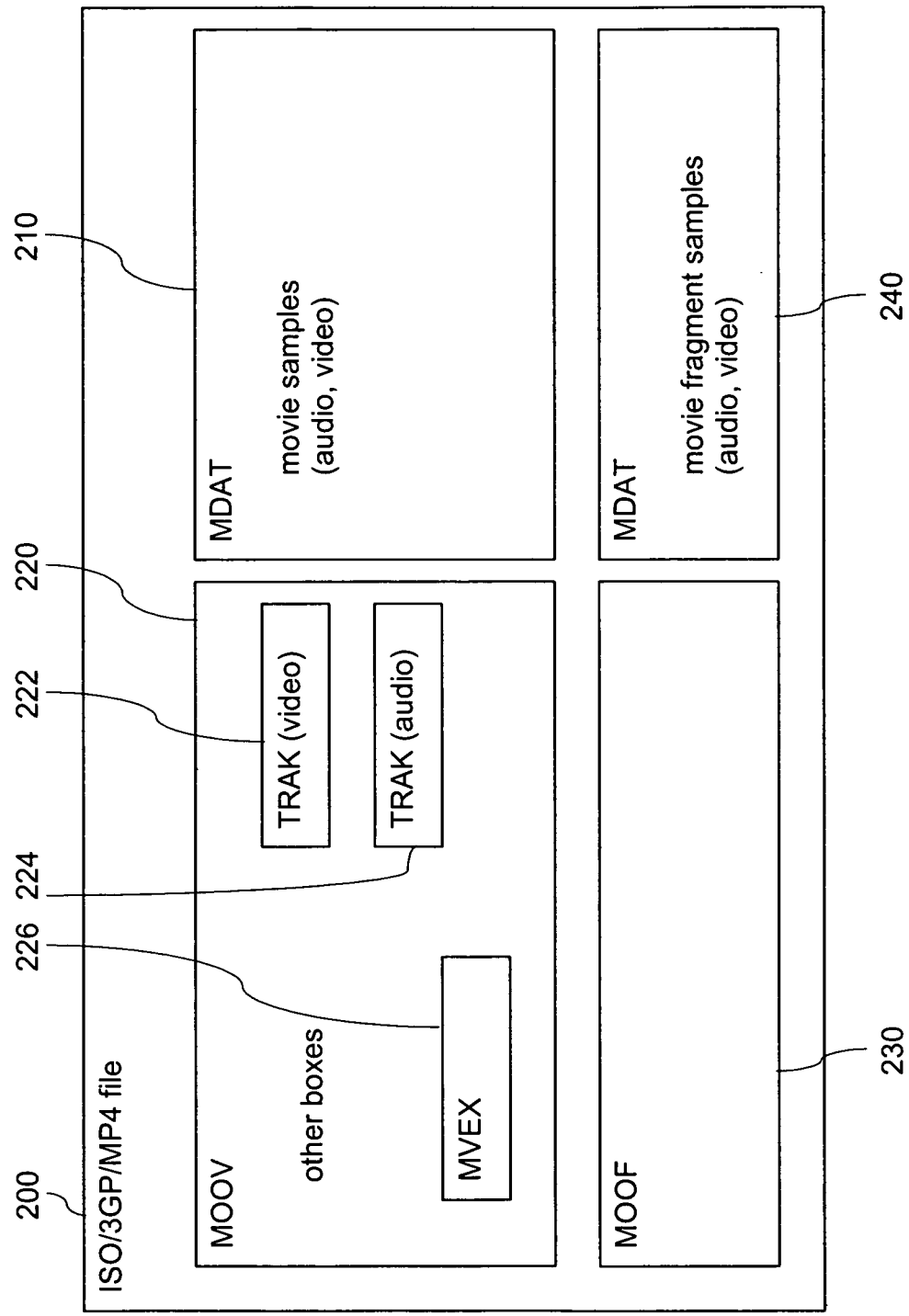
FIG. 2 is a schematic diagram of a file according to 3 GP/MP4 file format or ISO base media file format employed in the electronic device of FIG. 1.

The mobile TV receiver 100 makes use of the 3 GP/MP4 file format for storing a file in the memory 140. An exemplary file is presented schematically in FIG. 2. FIG. 2 is based on a diagram in the above cited standard ISO/IEC 14496-12:2005, which was supplemented for the storage of movie fragments.

According to the standard, the file 200 comprises zero or more MDAT boxes 210, 240, a MOOV box 220 and zero or more MOOF boxes 230. The MDAT boxes 210, 240 are media data containers storing media samples, for instance audio and video samples. The MOOV box 220 is a container for movie meta data. The MOOV box 220 describes the media content properties of a movie for which media samples are included in the MDAT box 210. To this end, the MOOV box 220 includes for instance a TRAK box 222 for video data and a TRAK box 224 for audio data. Other boxes not shown may indicate general file properties. In addition, the MOOV box 220 should include an MVEX box 226 if the file 200 contains media fragments. The MOOF box 230 is a container for movie fragment meta data. The MOOF box 230 describes the media content properties of movie fragments for which samples are stored in an associated MDAT box 240. For each MOOF box 230 there is a dedicated MDAT box 240 in the file 200, if the samples are in the same file. The MOOF box 230 must include a movie fragment header 'mfhd', may include zero or more track fragments 'traf', must include for each 'traf' a track fragment header 'tfhd' and may include zero or more track fragment runs 'trun'.

For the details of the ISO base media file format, it is referred to the standard ISO/IEC 14496-12:2005.

Figure 3:
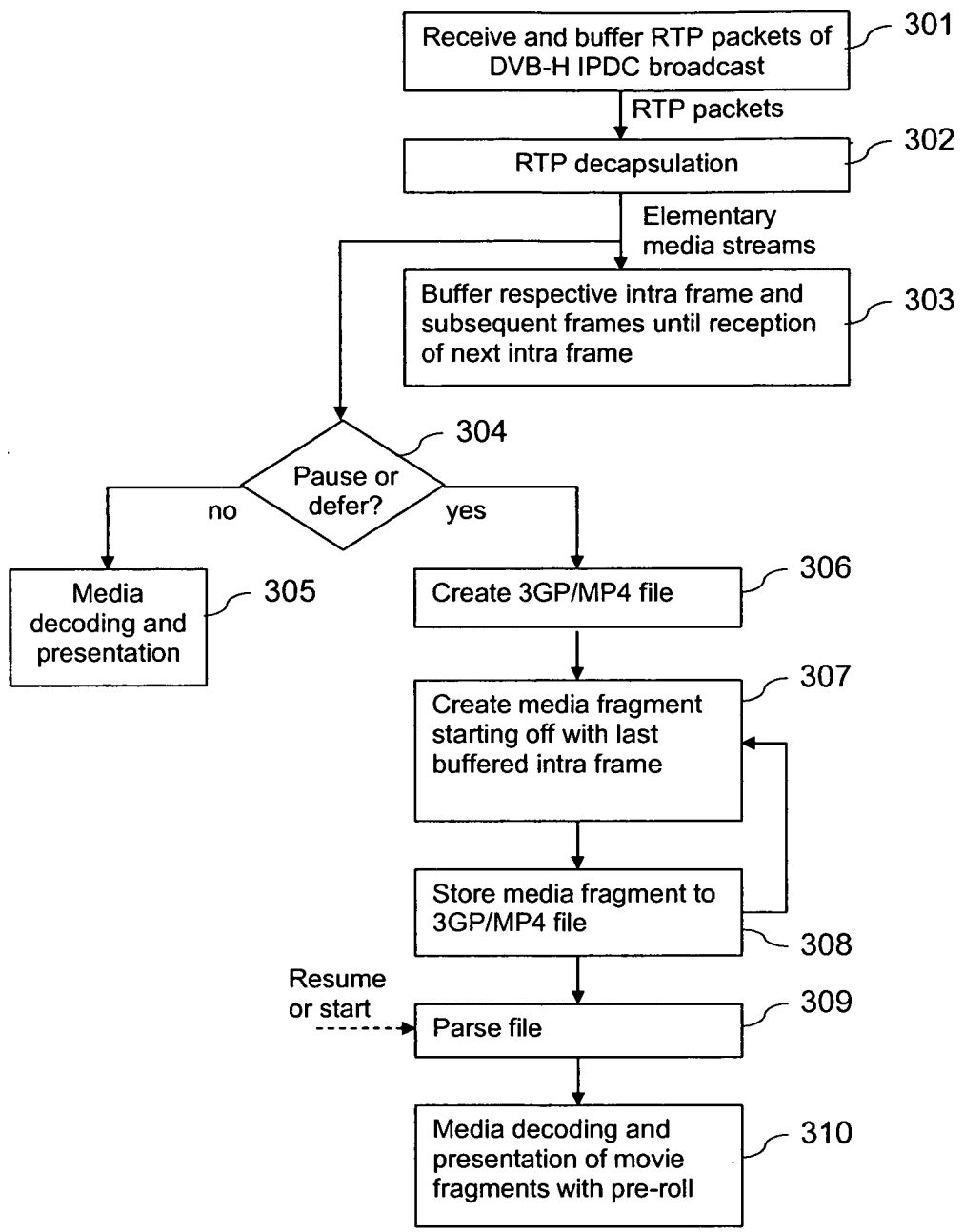
FIG. 3 is a flow chart illustrating a possible first operation in the electronic device of FIG. 1.

A first possible operation in the mobile TV receiver 100 will now be described with reference to the flow chart of FIG. 3.

DVB-H IPDC signals representing a movie are broadcast by a broadcast station of a DVB-H network. The signals are received by the receiving means 110 of the mobile TV receiver 100 and provided to the DVB-H IPDC protocol stack 121. The DVB-H IPDC protocol stack 121 forwards distinct RTP packets to the first buffer 130 (step 301).

The decapsulation component 122 retrieves the RTP packets from the first buffer 130 and decapsulates them to obtain elementary media streams (step 302). The elementary media streams comprise coded samples, for instance coded video pictures of a video data stream and/or coded audio frames of an audio data stream. They may comprise other types of media streams as well.

The coded samples of the media streams are buffered in the second buffer 132 (step 303). More specifically, a sequence of video pictures and an associated sequence of audio frames are buffered starting with a respective intra picture, until the next intra picture is provided. When the next intra picture is provided, the currently stored pictures and audio frames are removed and a sequence of new pictures and audio frames is buffered, starting with the new picture. It is to be noted that the term intra picture is used for referring to any picture in a media stream that can be decoded independently. In case of H.264/AVC video streams, for example, the included IDR pictures constitute such intra pictures. It is also to be noted that media types other than video may also contain such a sample type that can be decoded independently and another sample type whose decoding depends on other samples.

As long as the user does not press the pause/resume button 154 (step 304), the video pictures are moreover provided by the decapsulation component 122 to the video decoder 123 for decoding, while the audio frames are moreover provided by the decapsulation component 122 to the audio decoder 124 for decoding. The decoders 123, 124 give out raw video pictures and audio frames, which are then displayed on the display 150 and played via the loudspeakers 152, respectively (step 305). This audio/video processing may be realized in a conventional manner.

As soon as the user presses the pause/resume button 154 for pausing the presentation, the decapsulation component 122 stops providing the elementary media streams to the video decoder 123 and the audio decoder 124, so that the media decoding and presentation is stopped. The decapsulation component 122 thus constitutes an exemplary processing component adapted to interrupt the presentation for the chipset, the electronic device and the apparatus according to the invention.

Instead, the file writer 125 now starts the creation of a 3 GP/MP4 file 200 in the memory 140 (step 306). More specifically, the file writer 125 creates and stores an MDAT box 210 and a MOOV box 220, including an MVEX box 226 indicating that media fragments are present in MOOF boxes 230 with corresponding MDAT boxes 240. In addition, the file writer 125 creates a MOOF box 230 with the corresponding MDAT box 240 (step 307). Each movie fragment comprises, for both video and audio, the last buffered intra picture and the associated audio frames and all subsequent data samples until the next intra picture, exclusive.

The movie fragments are stored in the created 3 GP/MP4 file 200 in the memory 140 (step 308). More specifically, the file writer 125 writes the media samples for a respective media fragment into a MDAT box 240 and associated meta data into a MOOF box 230.

This recording continues as long as the transmission is ongoing, or until the user stops the presentation completely (steps 307/308). Each new movie fragment is recorded to the same file 200 right after the previous movie fragment in an own MOOF box 230 and an associated MDAT box 240.

It is to be understood that for deferring the entire presentation, the user could also request the enablement of a time-shifted presentation by pressing the button 154 before the start of the presentation (step 304) so that step 305 is not carried out at all. Steps 306 to 308 are the same as in the case of a pause request during an ongoing presentation.

When the user presses the pause/resume button 154 again for resuming or starting the presentation, the file parser 125 parses the 3 GP/MP4 file 200 in the memory 140, starting from the beginning of the first movie fragment (step 309).

It provides the coded data samples of a respective media fragment to the video decoder 123 and the audio decoder 124 for decoding and for presentation via the display 150 and the loudspeakers 152, respectively (step 310).

It has to be noted that the recording process (steps 307/308) may be a parallel process to the parsing, decoding and rendering process (steps 309-310).

It has to be noted that usually, the first movie fragment will comprise frames that have already been displayed, as the first movie fragment is created based on buffered frames in order to ensure that the first video picture is an intra picture. Therefore, the file parser 126 and the decoders 123, 124 first pre-roll to the pause position. That is, the first coded data samples are retrieved from the memory 140 and decoded, but not presented to the user. Only when the pause position is reached, the decoded frames are also presented. The file parser 126 may provide corresponding information to the decoders 123, 124.

Later pause and resume requests by the user can be implemented identically to pause and resume of a normal file playback, as the received movie data is stored after the first pause in media fragments until the end of the transmission anyhow.

In an alternative approach, the creation and storage of a respective movie fragment could be taken care of only at a point of time at which it is needed. In this case, the second buffer 132 should be able to buffer more pictures than from one intra picture to the next. Only when a user resumes playback after a pause or starts the playback after having deferred the presentation, a movie fragment is created starting from the end of the previous movie fragment, exclusive, or from the beginning of the file, if there was no previous movie fragment. The movie fragment lasts until the latest received intra picture, exclusive. When the parsing and decoding processes are about to reach the end of a movie fragment, a new movie fragment is created from the end of the previous movie fragment, exclusive, to the latest received intra picture, exclusive. This option requires passing of the pause and resume commands, etc., to the file writer 125.

With both alternatives, the distance between the decoding position of the file and the RTP stream reception position should be equal to or larger than the expected maximum intra picture interval. This ensures that there is always a new movie fragment available when the decoding of the previous movie fragment ends. The expected maximum intra picture interval in DVB-H IPDC can be derived from the expected maximum media playout time difference of the first and last media sample included in a time-slice, i.e., an MPE-FEC frame. It is up to the implementation of the user interface to disallow too short a time between pause and resume or between defer and start, and fast forwarding to a position too close to the current RTP reception position.

In both alternatives of the presented first possible operation, the movie fragment boundaries are aligned with intra pictures occurring naturally in the incoming media streams. This is not absolutely necessary, though.

Figure 4:
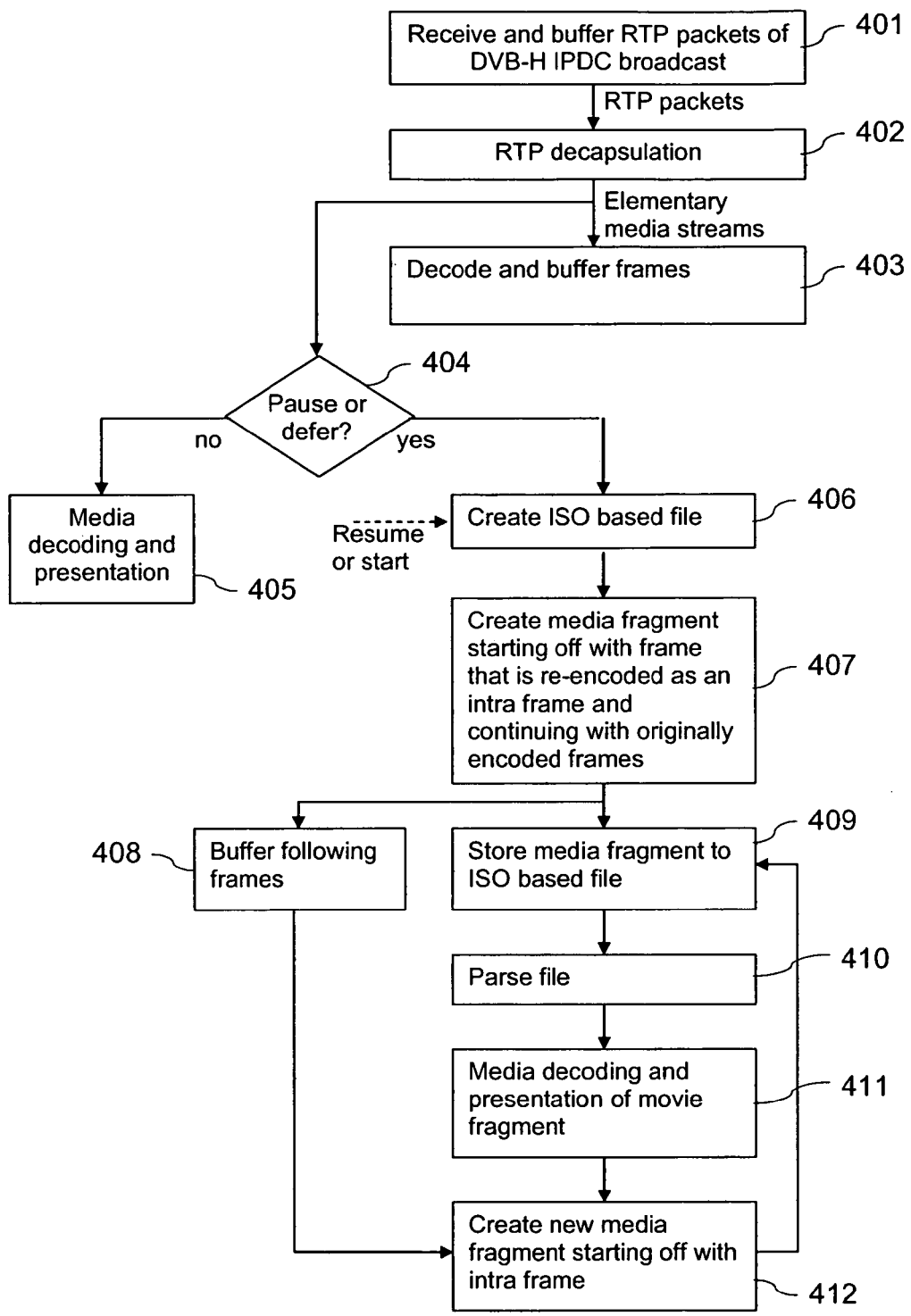
FIG. 4 is a flow chart illustrating a possible second operation in the electronic device of FIG. 1.

A second possible operation in the mobile TV receiver 100 enabling a free selection of movie fragment boundaries will now be described with reference to the flow chart of FIG. 4.

DVB-H IPDC signals representing a movie are broadcast by a broadcast station of a DVB-H network. The signals are received by the receiving means 110 of the mobile TV receiver 100 and provided to the DVB-H IPDC protocol stack 121. The DVB-H IPDC protocol stack 121 forwards distinct RTP packets to the first buffer 130 (step 401).

The decapsulation component 122 retrieves the RTP packets from the first buffer 130 and decapsulates them to obtain elementary media streams (step 402). The elementary media streams comprise at least a stream of audio frames and a stream of video frames. They may comprise other types of media streams as well.

The video pictures and the audio frames are provided by the decapsulation component 122 to the file writer 125, which decodes the audio frames and the video pictures and buffers them in the second buffer 134 in the decoded form (step 403). Only the respective last decoded video picture and the respective last decoded audio frame have to be buffered.

As long as the user does not press the pause/resume button 154 (step 404), the video pictures are moreover provided by the decapsulation component 122 to the video decoder 123 for decoding so that the video part of the movie may be presented on the display 150, while the audio frames are moreover provided by the decapsulation component 122 to the audio decoder 124 for decoding so that the audio part of the movie may be played via the loudspeakers 152 (step 405). This audio/video processing may be realized in a conventional manner.

As soon as the user presses the pause/resume button 154 for pausing the presentation (step 404), the decapsulation component 122 stops providing the elementary media streams to the video decoder 123 and the audio decoder 124, so that the media decoding and presentation is stopped.

Again, the user could also request the enablement of a time-shifted presentation by pressing the button 154 before the start of the presentation (step 404) so that step 405 is not carried out at all.

When the user presses the pause/resume button 154 again for resuming or starting the presentation, the file writer 125 starts the creation of a 3 GP/MP4 file in the memory 140 (step 406). More specifically, the file writer 125 creates an MDAT box 210 and a MOOV box 220, including an MVEX box 226 indicating that media fragments are present in MOOF boxes 230 with corresponding MDAT boxes 240. In addition, the file writer 125 creates a MOOF box 230 with the corresponding MDAT box 240 (step 407) and repeats this procedure for following movie fragments when necessary.

For creating a first movie fragment (step 407), the file writer 125 re-encodes the decoded video picture and the decoded audio frame, which are currently buffered in the second buffer 134, if the video picture is not an intra picture in the media stream received from the decapsulation component 122. The encoding is done without referring to any prior video pictures or audio frames. The re-encoded frames are the first coded samples for the movie fragment. They are followed by coded video pictures and audio frames from the elementary media streams received from the decapsulation component 122, until the next video intra pictures are reached. These intra pictures are not included in the first movie fragment anymore.

If the video picture currently buffered in the second buffer 134 is an intra picture, in contrast, the corresponding encoded data samples in the received media streams are used instead as the first coded samples of the movie fragment, as this ensures a better quality.

All following encoded frames received by the file writer 125 from the decapsulation component 122 are buffered in the second buffer 134 (step 408).

The created first media fragment is stored in the 3 GP/MP4 file 200 in the memory 140 (step 409). More specifically, the file writer 125 writes the media samples for a respective media fragment into an MDAT box 240 and associated meta data into a corresponding MOOF box 230.

The file parser 126 parses the 3 GP/MP4 file 200 in the memory 140, starting from the beginning of the first movie fragment (step 410). The file parser 126 provides the data of the media fragment to the audio decoder 123 and the video decoder 124 for decoding and for presentation via the loudspeakers 152 and the display 150, respectively (step 411).

When the decoding of the first movie fragment is about to end, the file parser 126 informs the file writer 125 accordingly. The file writer 125 creates thereupon a new movie fragment based on the buffered frames, starting off with an intra picture and using all subsequent pictures, until the next intra picture, exclusive (step 412).

The new movie fragment is stored in the 3 GP/MP4 file 200 in the memory 140, and the process is continued (steps 409 to 412) until the transmission is ended or until the user stops the presentation completely. In case the user causes a further pause, the creation and parsing of media fragments is simply interrupted and continued when the presentation is to be resumed.

It has to be noted that with this approach, only one reference picture for motion compensation is allowed, which is a restriction compared to the normal operation of H.264/AVC encoders. Furthermore, the re-encoding operation causes a degradation of the picture quality until the next normal intra picture in the stream.

In this case, however, a pre-rolling is not required.

If multiple reference pictures are in use in the received video streams, then the second buffer 134 is configured to contain all the reference pictures. Those pictures that are no longer needed for reference (i.e. marked as "unused for reference" according to the H.264/AVC standard) are removed from the second buffer 134. When the first movie fragment is created, all the pictures in the second buffer 134 at that time are encoded. The first picture in the second buffer 134 is encoded as an intra picture, whereas the other pictures can be encoded as inter or intra pictures. Similarly, if successful decoding of any audio sample requires decoding of more than one previous audio sample, then a sufficient number of decoded audio samples are buffered in the second buffer 134 and encoded as response to the creation of the first movie fragment.

Figure 5:
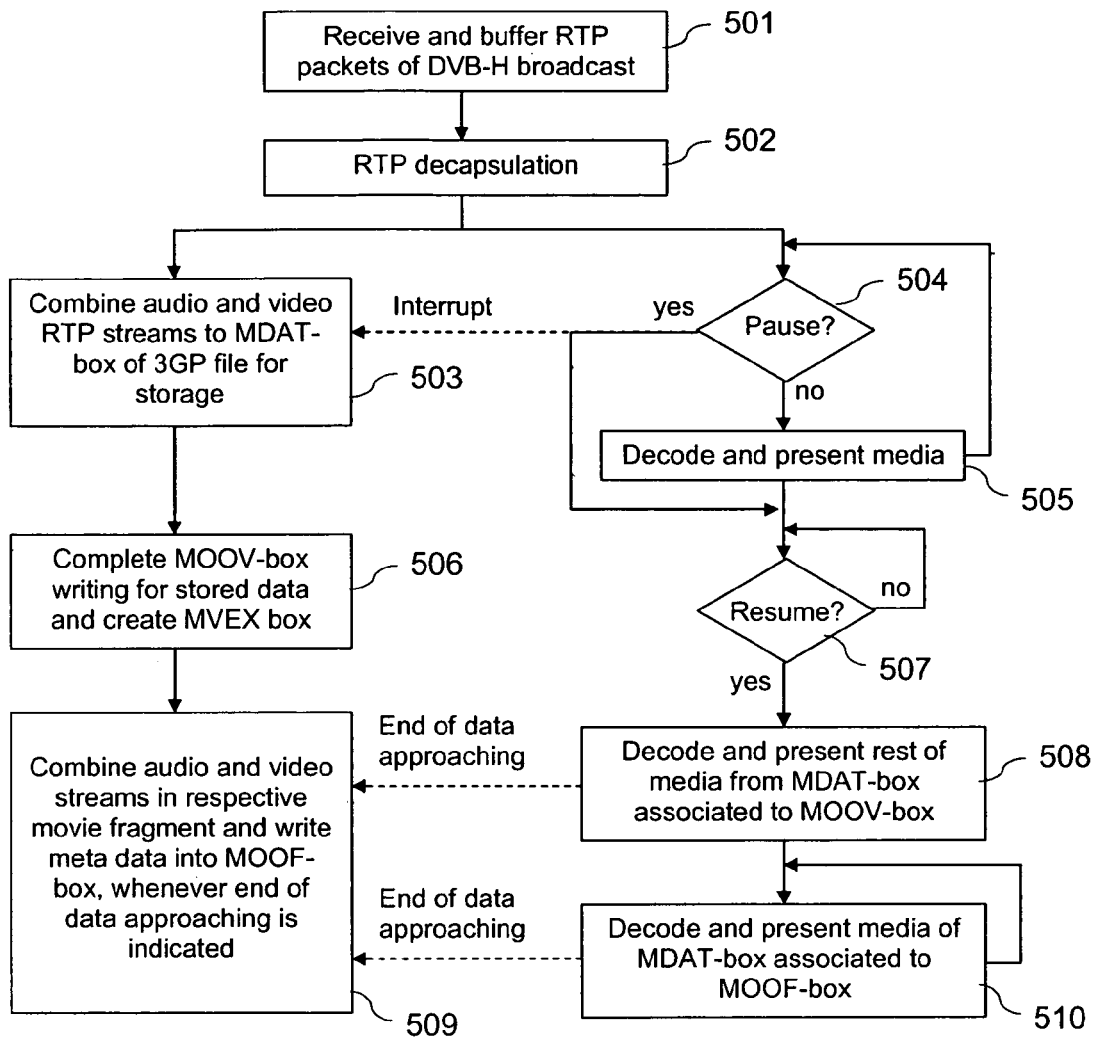
FIG. 5 is a flow chart illustrating a possible third operation in the electronic device of FIG. 1.

A third possible operation in the mobile TV receiver 100 will now be described with reference to the flow chart of FIG. 5.

In this case, a user wants to record and view a broadcast movie at the same time, and to have furthermore the possibility of pausing the presentation.

DVB-H IPDC signals representing a movie are broadcast by a broadcast station of a DVB-H network. The signals are received by the receiving means 110 of the mobile TV receiver 100 and provided to the DVB-H IPDC protocol stack 121. The DVB-H IPDC protocol stack 121 forwards distinct RTP packets to the first buffer 130 (step 501).

The decapsulation component 122 retrieves the RTP packets from the first buffer 130 and decapsulates them to obtain elementary media streams (step 502). The elementary media streams comprise at least a stream of audio frames and a stream of video pictures. They may comprise other types of media streams as well.

The audio frames and the video pictures are provided to the recorder 125, which combines the audio and video streams according to the standard ISO/IEC 14496-12:2005 to the MDAT box 210 of an ISO base media file format file 200 for storage in the memory 140 (step 503).

As long as the user does not press the pause/resume button 154 (step 504), the video pictures are moreover provided by the decapsulation component 122 to the video decoder 123 for decoding so that the video part of the movie may be presented on the display 150, while the audio frames are moreover provided by the decapsulation component 122 to the audio decoder 124 for decoding so that the audio part of the movie may be played via the loudspeakers 152 (step 505). This audio/video processing may be realized in a conventional manner.

As soon as the user presses the pause/resume button 154 for pausing the presentation (step 504), the decapsulation component 122 stops providing the elementary media streams to the video decoder 123 and the audio decoder 124 so that the media decoding and presentation is stopped.

Further, the recorder 125 is informed about the pause request.

The recorder 125 completes thereupon the MOOV-box writing of the ISO base media file format file 200 and stores all associated current media frames to the MDAT box 210 of the file 200 (step 506). The recorder also includes an MVEX box 226 in the MOOV-box 220, to warn any future file reader that this file 200 contains movie fragments.

As soon as the user presses the pause/resume button 154 again for resuming the presentation (step 507), the file parser

126 retrieves from the memory 140 the rest of the movie data in the MDAT box 210 that is associated to the MOOV box 220. This data is decoded by the video decoder 123 and the audio decoder 124 and presented via the display 150 and the loudspeakers 152, respectively (step 508).

When the end of the MOOV box 220 is reached, the file parser 126 notifies the recorder 125. Now, the recorder 125 starts writing a new MOOF box 230 with regular boxes, like 'mfhd', 'traf', 'trhd', 'trun', etc. and a corresponding MDAT box 240. The boxes of the MOOF boxes 230 comprise the meta data for combined audio and video streams that are stored in the form of a media fragment in MDAT boxes 240. One of the methods presented above with reference to FIGS. 3 and 4 is used to arrange intra pictures at the start of the movie fragment (step 509). It has to be noted that the movie fragment may comprise a plurality of intra pictures, though. All buffered frames up to the respective last intra picture, exclusive, are used for one movie fragment.

The first movie fragment thus needs to be written to the file 200 only when the reading of the file 200 is resumed and it reached the end of MOOV part 220 or the recording is ended. This determines the length of the movie fragment.

The file parser 126 may then continue with retrieving the media data in the first movie fragment from the memory 140. This data is decoded by the video decoder 123 and the audio decoder 124 and presented via the display 150 and the loudspeakers 152, respectively (step 510).

The same procedure is used for the creation and storage of subsequent movie fragments (steps 509, 510). That is, as soon as the file parser 126 notes that it reaches the end of the current movie fragment, it informs the recorder 125, and the recorder 125 creates and stores a new movie fragment in the file 200.

As a result, the 3 GP/MP4 file 200 is always ready to be read when required, while the broadcast recording continues to the end of the file (buffered).

If the buffer space of the recorder 125 is limited, it is also possible to determine a fixed length for the movie fragments. In this case, the movie fragment is always cut and buffered data is saved to the file in form of a movie fragment. This could be e.g. 5 seconds or 30 seconds, depending on the implementation and circumstances.

It is to be understood that for deferring the entire presentation, the user could also request the enablement of a time-shifted presentation by pressing the button 154 before the start of the presentation (step 504) so that the presentation at step 505 is not carried out at all. All other steps are the same as in the case of a pause request during an ongoing presentation.

Further, as the entire media stream is stored in this case, the request to resume or start the presentation could include an indication of a position in the media streams from which on the presentation is to be resumed or started. As such an indication cannot be provided by means of a simple button, other suitable elements of a user interface are used for this use case.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method comprising:
   creating a plurality of media fragments, each of said media fragments including media data from a respective one of subsequent sections of at least one received broadcast media stream and associated meta data, wherein at least one of said media fragments includes at least one encoded data component that can be decoded independently and at least one encoded data component that can only be decoded with knowledge about at least one preceding data component; and
   storing the media data of each of said media fragments to a respective media data section of a file and said associated meta data to a respective meta data section of said file,
   wherein an encoded data component of said at least one media stream that is to be used as a first encoded data component of said media fragment is decoded, and encoded again to an encoded data component that can be decoded independently.

2. The method according to claim 1, further comprising a step of interrupting an ongoing presentation of at least one received media stream upon a user request to pause said ongoing presentation.

3. The method according to claim 1, wherein a media fragment that is created subsequently to a first one of the media fragments comprises media data from one encoded data component in said at least one data stream that can be decoded independently to one of the following encoded data components that can be decoded independently, exclusive.

4. The method according to claim 1, wherein said plurality of media fragments are created at least for all media data of said at least one received media stream that are received after a user request to enable a time-shifted presentation.

5. The method according to claim 1, wherein a media fragment has a length that depends on a length between a user request to enable a time-shifted presentation and a user request to start a time-shifted presentation.

6. The method according to claim 1, wherein a first media fragment is created upon a user request to start a time-shifted presentation.

7. The method according to claim 1, wherein a predefined minimum time is required between a user request to enable a time-shifted presentation and a request to start a time-shifted presentation.

8. The method according to claim 1, wherein in case a user request to enable a time-shifted presentation is detected during a parallel ongoing storage of said at least one received media stream in a file,
   meta data is created for said stored part of said at least one received media stream and stored in said file, said meta data comprising an indication of a presence of media fragments, and
   in the following said media fragments are stored in said file.

9. The method according to claim 1, wherein said at least one received media stream is at least one media stream of a Digital Video Broadcasting-Handhelds broadcast.

10. The method according to claim 1, wherein said at least one received media stream comprises at least one of a video data stream with video data in an H.264 Advanced Video Codec video format and an audio data stream with audio data in a High-Efficiency Advanced Audio Codec version 2 audio format, and wherein said file has one of a Third Generation Partnership Project file format and a Moving Picture Experts Group-4 file format.

11. The method according to claim 1, wherein said file complies with the International Organization for Standardization base media file format and wherein said meta data section is a MOOF box defined for said International Organization for Standardization base media file format.

12. The method according to claim 1, wherein in case of a user request to start a time-shifted presentation, parsing said file for retrieving media data of a respective media fragment for presentation.

13. The method according to claim 12, wherein said user request to start a time-shifted presentation is one of a request to present said media data from a beginning of said media stream, a request to present said media data from an indicated position in said media stream and a request to resume an interrupted presentation of said at least one media stream after a preceding pause request by a user.

14. An apparatus comprising at least one processor and a memory including software code, the memory and the software code configured to, with the at least one processor, cause the apparatus to perform:
   create a plurality of media fragments, each of said media fragments including media data from a respective one of subsequent sections of at least one broadcast received media stream and associated meta data, wherein at least one of said media fragments includes at least one encoded data component that can be decoded independently and at least one encoded data component that can only be decoded with knowledge about at least one preceding data component, and
   store the media data of each of said media fragments to a respective media data section of a file and said associated meta data to a respective meta data section of said file,
   wherein the memory and the software code are configured to, with the at least one processor, cause the apparatus to decode an encoded data component of said at least one media stream that is to be used as a first encoded data component of said media fragment, and to encode said decoded data component again to an encoded data component that can be decoded independently.

15. The apparatus according to claim 14, wherein the memory and the software code are further configured to, with the at least one processor, cause the apparatus to interrupt an ongoing presentation of at least one received media stream upon a user request to pause said ongoing presentation.

16. The apparatus according to claim 14, wherein media data of said at least one media stream comprises encoded data components that can be decoded by themselves and encoded data components that can only be decoded with knowledge about at least one preceding data component, and wherein the memory and the software code are configured to, with the at least one processor, cause the apparatus to create media fragments with media data which comprises for each media stream at least the first encoded data component that can be decoded independently.

17. The apparatus according to claim 14, further comprising a user interface configured to enable a user to control a time-shifted presentation of at least one received media stream, said user interface enabling a user to at least one of:
   enter a request to enable a time-shifted presentation;
   enter a request to enable a time-shifted presentation, wherein said request includes a request to pause an ongoing presentation;
   enter a request to start a time-shifted presentation;
   enter a request to start a time-shifted presentation, wherein said request is a request to present media data from a beginning of said media stream;
   enter a request to start a time-shifted presentation, wherein said request is a request to present media data from an indicated position in said media stream; and
   enter a request to start a time-shifted presentation, wherein said request is a request to resume an interrupted presentation of said at least one media stream after a preceding pause request by a user.

18. The apparatus according to claim 14, wherein said apparatus is one of a mobile television receiver, a stationary television receiver, a mobile radio receiver, a stationary radio receiver, a mobile communication device, a laptop and a stationary personal computer.

19. The apparatus according to claim 14, wherein the memory and the software code are configured to, with the at least one processor, cause the apparatus to create a plurality of media fragments at least for all media data of said at least one received media stream that are received after a user request to enable a time-shifted presentation.

20. The apparatus according to claim 14, wherein the memory and the software code are configured to, with the at least one processor, cause the apparatus to create media fragments having a length that depends on a length between a user request to enable a time-shifted presentation and a user request to start a time-shifted presentation.

21. The apparatus according to claim 14, wherein the memory and the software code are configured to, with the at least one processor, cause the apparatus to create a first media fragment upon a user request to start a time-shifted presentation.

22. The apparatus according to claim 14, wherein the memory and the software code are configured to, with the at least one processor, cause the apparatus to
   detect a user request to enable a time-shifted presentation during a parallel ongoing storage of said at least one received media stream in a file, and
   to create meta data for said stored part of said at least one received media stream, to store said meta data in said file, said meta data comprising an indication of a presence of media fragments, and to store in the following said media fragments in said file.

23. The apparatus according to claim 14, further comprising at least one of:
   receiving means configured to receive a broadcast media stream;
   a display;
   a loudspeaker; and
   a memory.

24. The apparatus according to claim 14, wherein the memory and the software code are further configured to, with the at least one processor, cause the apparatus to parse a file for retrieving media data of a respective media fragment for presentation in case of a user request to start a time-shifted presentation.

25. The apparatus according to claim 24, wherein said user request to start a time-shifted presentation is one of a request to present said media data from a beginning of said media stream, a request to present said media data from an indicated position in said media stream and a request to resume an interrupted presentation of said at least one media stream after a preceding pause request by a user.

26. A method comprising:
   creating a plurality of media fragments, each of said media fragments including media data from a respective one of subsequent sections of at least one received broadcast media stream and associated meta data, wherein at least one of said media fragments includes at least one encoded data component that can be decoded independently and at least one encoded data component that can only be decoded with knowledge about at least one preceding data component; and storing the media data of each of said media fragments to a respective media data section of a file and said associated meta data to a respective meta data section of said file, wherein each media fragment following on a preceding media fragment is created only when decoding of said preceding media fragment is about to reach an end.

27. The method according to claim 26, wherein media data of said at least one received media stream is buffered after reception back to a respective last encoded data component that can be decoded independently, and each media fragment is created for each media stream from encoded data components starting from a respective buffered last encoded data component that can be decoded independently.

28. The method according to claim 27, wherein upon a user request to start a time-shifted presentation after a preceding pause request, said media data of a media fragment is decoded starting with the first encoded data component of said at least one media stream in said media fragment, but wherein said media data of said media fragment is presented only starting with a data component of said at least one media stream that was not yet presented at a time of said pause request.

29. An apparatus comprising at least one processor and a memory including software code, the memory and the software code configured to, with the at least one processor, cause the apparatus to perform:

create a plurality of media fragments, each of said media fragments including media data from a respective one of subsequent sections of at least one broadcast received media stream and associated meta data, wherein at least one of said media fragments includes at least one encoded data component that can be decoded independently and at least one encoded data component that can only be decoded with knowledge about at least one preceding data component, and store the media data of each of said media fragments to a respective media data section of a file and said associated meta data to a respective meta data section of said file, wherein the memory and the software code are configured to, with the at least one processor, cause the apparatus to create each media fragment following on a preceding media fragment only when decoding of said preceding media fragment reaches an end.

30. The apparatus according to claim 29, comprising a buffer configured to buffer media data of said at least one received media stream after reception back to a respective last encoded data component that can be decoded independently, wherein the memory and the software code are configured to, with the at least one processor, cause the apparatus to create each media fragment for each media stream from encoded data components starting from a respective buffered last encoded data component that can be decoded independently.

* * * * *